United States Patent [19]

Dumestre, III

[11] Patent Number: 4,472,966
[45] Date of Patent: Sep. 25, 1984

[54] MARINE SPEED LOG

[75] Inventor: Alex C. Dumestre, III, Destrehan, La.

[73] Assignee: The Laitram Corporation, New Orleans, La.

[21] Appl. No.: 378,178

[22] Filed: May 14, 1982

[51] Int. Cl.³ .................. G01C 21/16; G01C 21/10
[52] U.S. Cl. ................................. 73/181; 73/183
[58] Field of Search .............. 73/181, 183, 861.08, 73/861.15, 861.12, 188, 189; 364/443, 444

[56] References Cited

U.S. PATENT DOCUMENTS 3,431,778  3/1969  Lemon et al. .................. 73/181
3,693,440  9/1972  Olson .......................... 73/861.15
3,940,983  3/1976  Greene ......................... 73/189 X Primary Examiner—Gerald Goldberg
Assistant Examiner—James R. Giebel
Attorney, Agent, or Firm—Weingarten, Schurgin Gagnebin & Hayes

[57] ABSTRACT

A marine speed log for providing an indication of the relative velocity of a vessel through water and an indication of the forward or reverse direction of travel. An output indication of total distance travelled can also be provided. The speed log is operable in both salt and fresh water without any change in calibration and incorporates a transducer having an air core. The speed log provides high sensitivity and high rejection of noise.

8 Claims, 4 Drawing Figures

MARINE SPEED LOG

FIELD OF THE INVENTION

The present invention relates to devices measuring velocity relative to a liquid or water medium, and more particularly to speed logs for measuring the relative velocity of a vessel through water.

BACKGROUND OF THE INVENTION

Generally, marine speed log devices employ sensing transducers having a magnetic coil comprising many turns of fine wire about an iron core or laminated iron core. The coil is periodically energized at a frequency of 50 or 60 Hz, which corresponds to the available power line frequency, which allows the speed log device to become sensitive to signals induced from a field caused by the available AC source power, causing erroneous indications.

Speed log systems have required a different calibration procedure for each five knot interval in velocity. Furthermore, it is often necessary to provide a switch to accommodate a change from fresh to salt water, due to the change in conductivity of the water.

Speed logs have generally provided velocity information in the forward direction alone, making it impossible to determine the total distance travelled. It is frequently required that the speed be indicated in the reverse direction as well to provide accurate navigation and position determination.

SUMMARY OF THE INVENTION

The present invention incorporates an electromagnetic water velocity transducer having a coil on an air core, and operated at a frequency significantly higher than the power souce frequency, to provide a high sensitivity and low noise speed log operation. Furthermore, due to the high operating frequency, the speed log is made insensitive to noise signals corresponding to the power source frequency.

The present invention measures water velocity in both salt and fresh water, with no change in calibration required. This is accomplished by a high source impedance of the drive circuit combined with a high common mode rejection of the input amplifiers. Moreover, the input stages of the receiver have a high saturation level to accommodate velocities up to 50 to 60 knots.

The speed log includes a computer which provides both velocity and direction signals. It is therefore possible, according to the present invention, to provide indication of forward or reverse travel of the ship and the total distance travelled.

BRIEF DESCRIPTION OF THE DRAWING

These and other objects of the present invention will be better understood according to the drawings, when read together with the detailed description wherein.

DETAILED DESCRIPTION OF THE INVENTION

Figure 1:
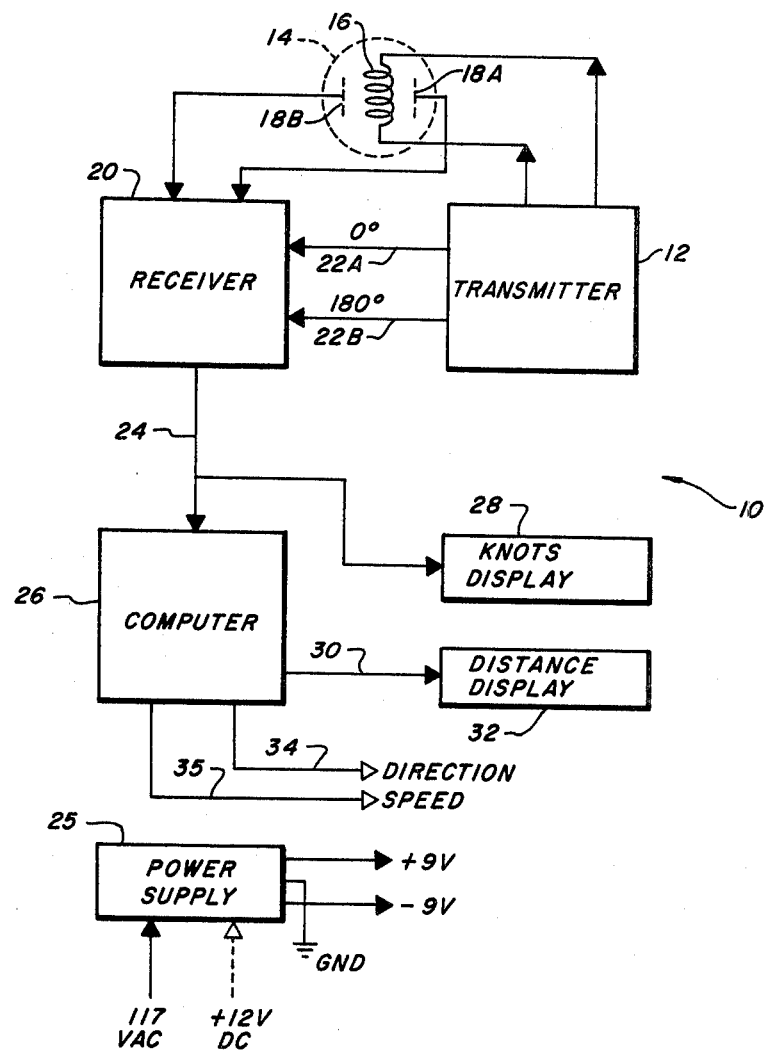
FIG. 1 is a block diagram of the speed log system.

The speed log system 10 is shown in FIG. 1, wherein a transmitter 12 periodically energizes a magnetic coil 16 included within a transducer 14. The transducer is mounted on the external surface of a ship oriented to have the electrostatic field produced proportional to the forward velocity of the ship through the water medium. The change in field is detected by electrostatic sensors 18A and 18B contained within transducer 14, and received by receiver 20. The receiver 20 also receives the complimentary pair of oscillator signals generated within transmitter 12, which signals correspond in phase and frequency to the signal energizing the magnetic coil 16. The receiver produces a detected signal proportional to the field sensed by the sensors 18A and 18B. The receiver output is received along lead 24 by a computer 26. The receiver output on lead 24 is also received by a display 28 providing visual indication of the velocity in knots. The computer output on lead 30 is received by a display 32 providing a record of the accumulated distance travelled. The computer 26 also provides on lead 34 a bilevel signal corresponding to the direction currently travelled by the ship.

Figure 2:
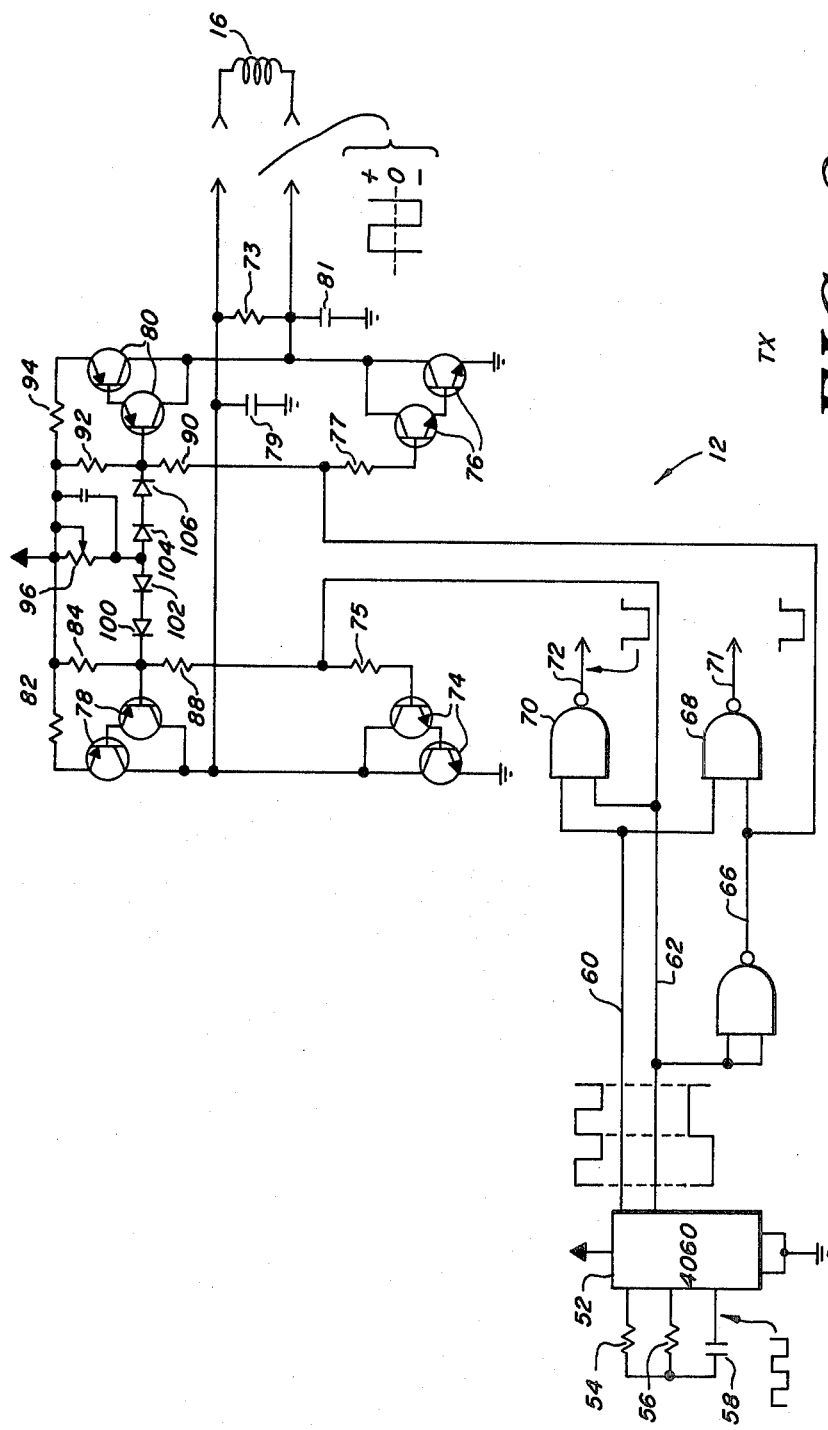
FIG. 2 is a schematic diagram of the transmitter section of the speed log system.

The transmitter 12 is shown in greater detail in FIG. 2. Integrated circuit 52 is connected by resistors 54, 56 and capacitor 58 to provide a periodic squarewave signal of 300 Hz on lead 60 and a 150 Hz signal on lead 62. The edge transitions of the signals on leads 60 and 62 occur simultaneously. Integrated circuit 64 receives the signal from lead 62 and provides an inverted signal on lead 66 which is in turn received by gate 68. The gate 68 includes the signal of lead 60 to provide a negative-going pulse to be received by a synchronous receiver discussed below. Similarly, the signals on lead 60 and 62 are received by the gate 70 to provide a negative-going pulse on lead 72 to be received by the synchronous receiver discussed below. The signals on leads 66 and 62 are received by two complimentary switchable current sources having the coil 16 of FIG. 1 operated in a bridge configuration therebetween. The lower portion of each switchable current source incorporate Darlington transistors 74 and 76 which are connected to saturate whenever the drive signals on lead 62 and 66 are positive. The upper transistors 78 and 80 are biased by resistors 82, 84, 86, 88, 90, 92, 94 and 96, diodes 100, 102, 104 and 106 to form a constant current source according to design topology known in the art. By connecting the current source and the coil 16 in a bridge configuration, the coil is energized by constant currents flowing in alternating directions, without the necessity of a center tap thereon.

Figure 3:
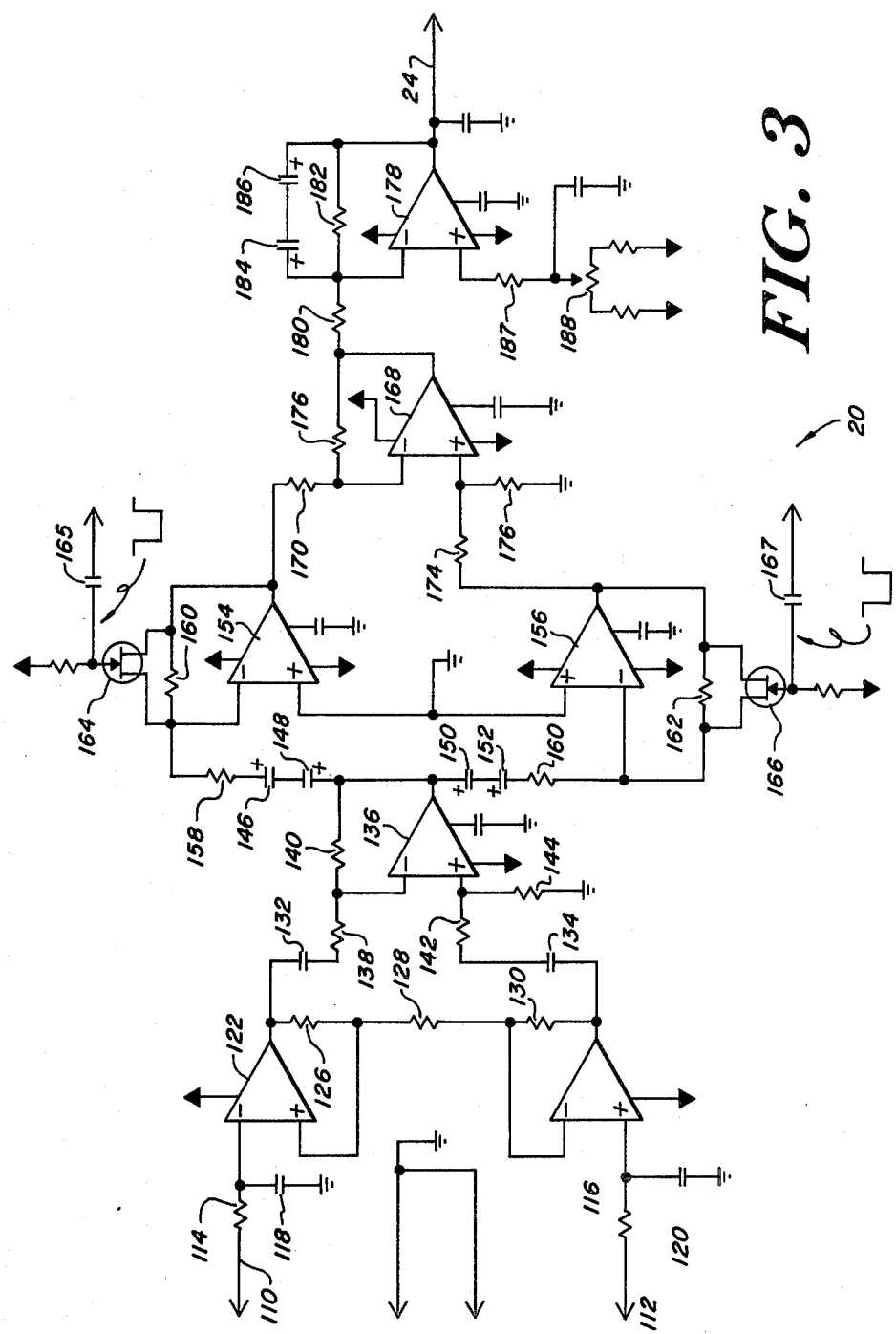
FIG. 3 is a schematic diagram of the receiver portion of the speed log system.

The receiver 20 is shown in FIG. 3. The receiver 20 receives the electrostatic sensors 18A and 18B at inputs 110 and 112. The inputs are filtered by resistors 114 and 116 and capacitors 118 and 120 to remove spurious high frequency signals. The input signals are then received by the non-inverting inputs of amplifiers 122 and 124 which are connected in a differential mode by resistors 126, 128 and 130. The outputs are AC coupled through capacitors 132 and 134 to remove the DC level shift and drift signals produced at the output of amplifiers 122 and 124. Thereafter, the signals are combined by an amplifier 136 connected in a differential input topography by resistors 138, 140, 142 and 144. The output is also AC coupled through capacitors 146 and 148 and capacitors 150 and 152 comprising polarized capacitors connected back-to-back to form a non-polarized, high capacitance, coupling capacitor. The signals are thereafter received by amplifier 154 and 156 through series input resistors 158 and 160. The corresponding feedback resistors 160 and 162 are selectively shorted by field effect transistors 164 and 166, respectively. The shorting of the feedback resistors 160 and 162 effectively eliminates the signal from the amplifier 154 and 156 outputs, respectively. The field-effect (FET) transistors 164 and 166 are alternately energized according to signals produced from the transmitter 12 leads 72 and 71, shown in FIG. 2. The amplifiers 154 and 156 outputs are then received by an amplifier 168 connected in a differential amplifier mode by resistors 170, 172, 174 and 176 wherein the alternate energization of switching FET transistors 164 and 166 operate to form a receiver synchronized to the energization of the transmitter coil 16 wherein the output from amplifier 168 has a sign corresponding to the direction of ship travel through the water medium. Thus, in a forward direction, the signal will read of one polarity and the aft direction will cause the signal to reverse polarity. The amplitude corresponds to the velocity of movement therethrough. The amplifier 168 output is received by amplifier 178 through input resistor 180. The amplifier 178 includes a feedback resistor 182 and capacitors 184 and 186 connected back-to-back to form a non-polarized capacitor; in this configuration, the amplifier 178 has a low-pass filter configuration. The non-inverting input of the amplifier 178 is connected through a DC offset adjust including resistor 188. The output of amplifier 178 is then received by the velocity display 28. The velocity display 28 displays the analog signal in a digital numeric readout corresponding to a velocity of knots.

Figure 4:
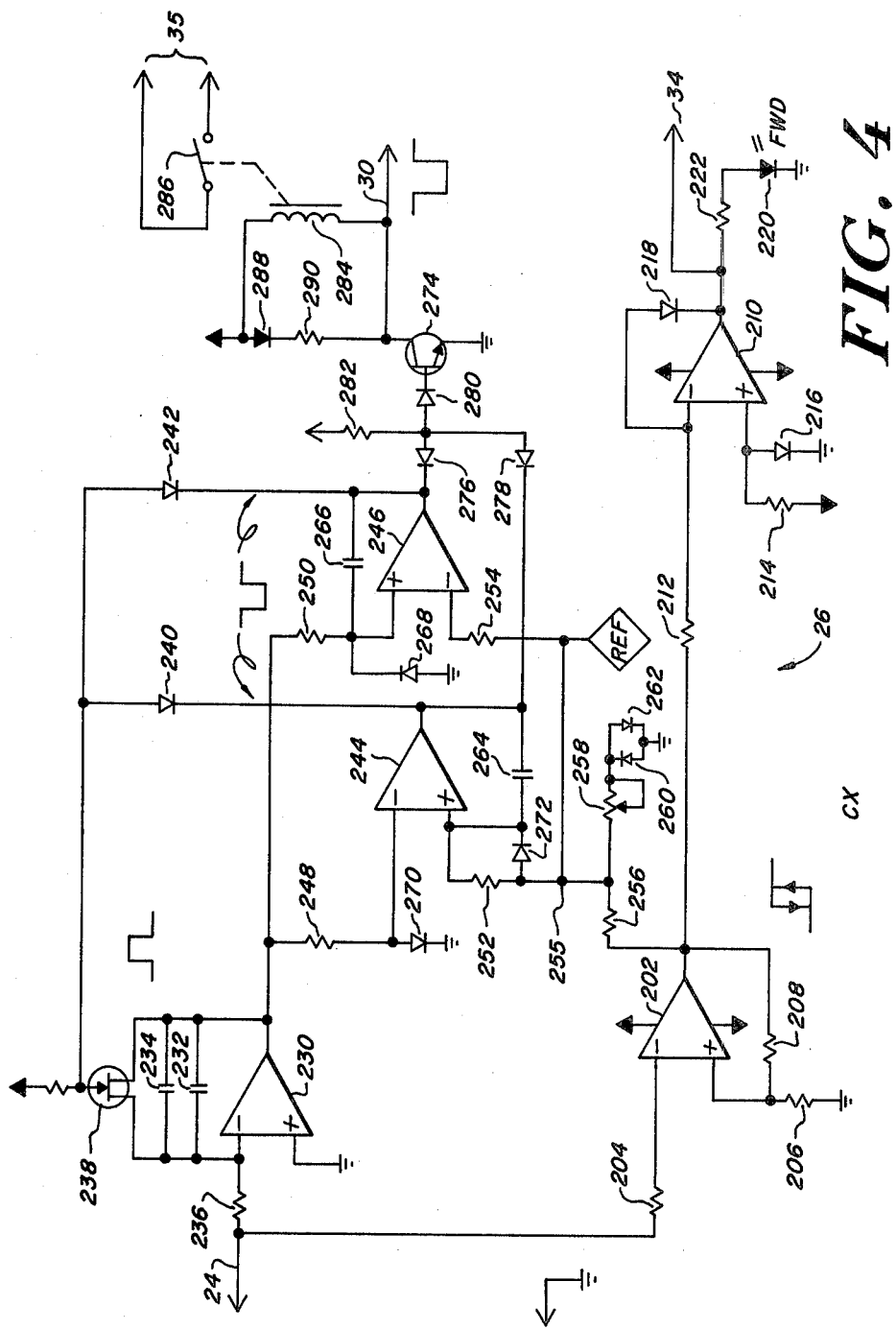
FIG. 4 is a schematic diagram of the analog computer system of the speed log according to one embodiment.

The receiver output on lead 24 is received by the computer 26 shown in FIG. 4. In the computer shown, the output from the receiver along lead 24 is received by amplifier 202 through resistor 204. The amplifier 202 is connected in a comparator mode referenced to ground through resistor 206 and having a slight amount of positive feedback through resistor 208 to generate a slight hysteresis response to the signal received along lead 24, corresponding to about ±0.05 knots. The output of amplifier 202 swings between a +8 volt and −8 volt value and is received by amplifier 210 through resistor 212. The amplifier 210 is also connected as a comparator referenced to a voltage slightly above ground through resistor 214 and bias diode 216. The amplifier 210 is connected by feedback diode 218 to provide a zero voltage signal when travelling in the reverse direction and a positive 8 volt signal when travelling in the forward direction; accordingly the signal is produced on lead 34. Also, the forward direction is indicated by a light-emitting diode (LED) 220 which is illuminated under forward motion by a current passing through resistor 222. The forward/reverse signal on lead 34 is then connected to external equipment (not shown) which require the indication of forward/aft movement.

To provide the speed indication, the signal on lead 24 is received by a resetable integrator formed by amplifier 230 and feedback capacitors 232 and 234 together with input resistor 236. Since the signal on lead 24 may be of either polarity, the integrator formed by amplifier 230 may have an output of either polarity. When an input signal is received on lead 24, the integrator continues to increase the voltage output until it is reset to zero by FET 238 which receives a signal through diodes 240 or 242 from either amplifier 244 or 246 which are connected as comparators. The inverting input of amplifier 244 and the non-inverting input of amplifier 246 receives the output from the integrator amplifier 230 through resistors 248 and 250, respectively. The non-inverting input of amplifier 244 and the inverting input of amplifier 246 receives a reference input signal (point 255) through resistors 252 and 254, respectively. A selectable voltage reference source at point 255 is formed by resistor 256 and adjustable resistor 258 and diodes 260 and 262. The diodes 260 and 262 provide temperature compensation. The resistor 256 is connected to the output of amplifier 202 (which swings from +8 volts to −8 volts) to provide a selectable ±3.25 volts at point 255. Capacitors 264 and 266 are connected across amplifiers 244 and 246, respectively, adding a slight amount of positive feedback to provide a finite duration about (20 ms) of the output signals. Diodes 268 and 270 serve to limit the signal received by the respective amplifiers, and diodes 272 aids in discharge of capacitor 264.

In operation, when the signal on lead 24 is positive, corresponding to a forward direction, the integrator formed from amplifier 230 provide a signal decreasing from zero. Concurrently, the amplifier 202 output is at a −8 volt value providing a −3.25 volt reference signal at point 255 allowing amplifier 244 to generate a negative voltage signal which is received by FET 238 through diode 240 causing the integrator to be reset to zero. Capacitor 264 assures that the reset signal is of sufficient duration to cause the FET 238 to discharge capacitors 234 and 232 to a zero voltage level. After the integrator is reset, the sequence repeats, forming a sequence of pulses proportional in number to the distance covered by the vessel. Similarly, when the input signal is of a negative polarity, corresponding to a reverse ship direction, the integrator formed by amplifier 230 will provide a voltage increasing from zero. Simultaneously, the amplifier 202 output is at a +8 volt level which causes a reference voltage at point 255 to have a value of +3.25 volts. The integrator output will continue increasing until the voltage exceeds 3.25 volts, at which time the amplifier 246 will provide a negative going signal to the FET 238 through diode 242 to reset the integrator. Capacitor 256 allows the amplifier 246 low level output to continue until the capacitors 232 and 234 are completely discharged. The outputs from amplifiers 244 and 246 are received by driver transistor 274 through diodes 276, 278 and 280. The diodes 276 and 278 in combination with resistor 282 form a logical OR function and diode 280 limits the direction of the current flow to current flowing into the base of the transistor. The transistor 274 selectively energizes relay winding 284 which provides an uncommitted relay contact 286 to be operated concurrent with the output pulse signal on lead 30. The contact 286 is available to external equipment (not shown) and may be connected as desired. The relay coil is shunted with a series combination of diode 288 and resistor 290. The output from the transistor 274 provides a negative going pulse along lead 30 to be received by the distance display 32, shown in FIG. 1. The distance display comprises typically a binary counter having a visible decimal readout. The circuit herein described provides a sequence of output pulses corresponding to 200 pulses per nautical mile.

The power supply 25 supplies +9 and −9 volts to the above described elements. The power supply 25 is connected to a line power, or alternately to a battery source, typically 117 VAC and +12 VDC respectively.

Alternate embodiments are within the scope of the present invention, which is not limited to the above embodiment except as claimed as follows.

What is claimed is:

1. A speed log comprising:
   transducer means for operation in a liquid medium having a coil to create a magnetic field and electrostatic detectors disposed relative to said coil to provide a voltage in response to the motion of said transducer relative to said liquid medium;
   transmitter means selectively providing a periodic current output signal to said coil and a corresponding oscillator output signal;
   receiver means synchronously detecting said transducer electrostatic detector voltage according to said oscillator output signal, providing an output signal according to the velocity of said transducer relative to said medium, said output signal having a polarity relating the direction of said relative transducer motion; and
   computer means receiving said receiver output, comprising direction detector means providing a forward signal when said receiver output polarity corresponds to the forward direction, and distance measurement means providing an output corresponding to the distance travelled through said liquid medium in both forward and reverse direction.

2. The speed log of claim 1 further including:
   distance display means connected to said distance measurement means output providing a visual indication of the total distance travelled.

3. The speed log of claim 2 further comprising:
   velocity display means connected to said receiver output providing visual indication of said velocity.

4. The speed log of claim 1 wherein said coil is an air core coil.

5. The speed log of claim 4 wherein said transmitter periodic output signal is 150 Hz.

6. The speed log of claim 1 wherein said distance measurement means output comprises a signal pulse corresponding to a predetermined travelled distance.

7. The speed log of claim 6 wherein two hundred said signal pulses corresponds to a distance of one nautical mile.

8. The speed log of claim 7 wherein said distance measurement means includes:
   a resettable integrator receiving said receiver output signal having and output signal polarity corresponding to said polarity of said receiver output signal;
   a selectable reference source having an output polarity corresponding to said polarity of said receiver output signal; and
   comparator means providing a reset signal to said resettable integrator output exceeds said selectable reference source output causing said resettable integrator output signal to be reset to zero.

* * * * *

UNITED STATES PATENT AND TRADEMARK OFFICE
CERTIFICATE OF CORRECTION

PATENT NO. : 4,472,966
DATED : September 25, 1984
INVENTOR(S) : Alex C. Dumestre, III It is certified that error appears in the above—identified patent and that said Letters Patent is hereby corrected as shown below:

Column 3   Line 61,   "resetable integrator" should read --resettable integrator--

Column 4   Line 20,   "diodes 272 aids in" should read --diodes 272 aid in--

Line 24,   "230 provide a" should read --230 provides a--

Column 6   Line 21,   "having and output" should read --having an output--

Line 28,   "output exceeds" should read --output when said resettable integrator output exceeds--

Signed and Sealed this

Twelfth Day of November 1985

[SEAL]

Attest:

DONALD J. QUIGG

Attesting Officer     Commissioner of Patents and Trademarks